Sept. 5, 1950  H. H. SEYLER  2,521,487
HOG HANDLING APPARATUS
Filed May 13, 1946  2 Sheets-Sheet 2

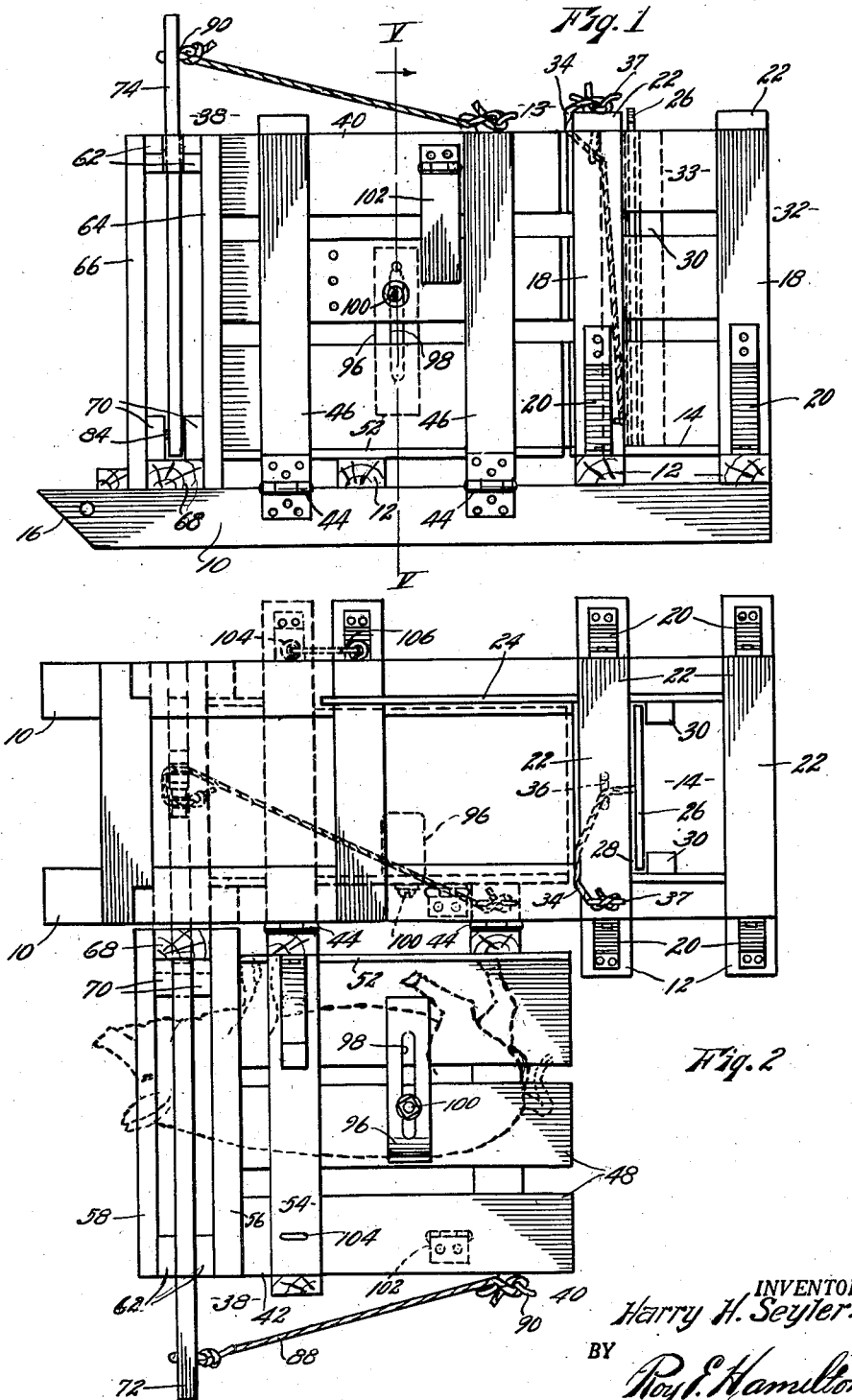

INVENTOR,
Harry H. Seyler.
BY
Roy E. Hamilton,
Attorney.

Patented Sept. 5, 1950

2,521,487

UNITED STATES PATENT OFFICE 2,521,487

HOG HANDLING APPARATUS

Harry H. Seyler, Wellsville, Kans.

Application May 13, 1946, Serial No. 669,416

4 Claims. (Cl. 119—99)

This invention relates to improvements in animal handling apparatus and has particular reference to an apparatus for handling hogs.

The principal object of the present invention is the provision of a hog rack having a stanchion for engaging the neck of a hog and having hinged section adapted to be moved from the vertical position to a horizontal position whereby the hog secured in the said stanchion will be positioned horizontally.

Another object of this invention is the provision of a portable apparatus having a vertically operable gate adjacent its one end and a stanchion adjacent its other end, said stanchion being carried by a hinged section of the apparatus whereby a hog may be driven into the rack in front of said gate with his head extended through said stanchion, and means for securing said stanchion against the animal's neck whereby when said hinged section is moved about its hinge the hog may be moved to the horizontal position on a side section of the rack.

Other objects are simplicity and sturdiness of construction, ease and efficiency of operation, and adaptability for use in the handling of various kinds of animals.

With these objects in view as well as other objects which will appear during the course of the operation reference will be had to the drawings wherein Figure 1 is a side elevation of an animal handling apparatus embodying this invention.

Fig. 2 is a plan view of the apparatus showing the hinged section in solid lines in the horizontal position and in dotted lines in the vertical position. Also the position of the hog is shown in dotted lines in the horizontal position.

Figure 4:
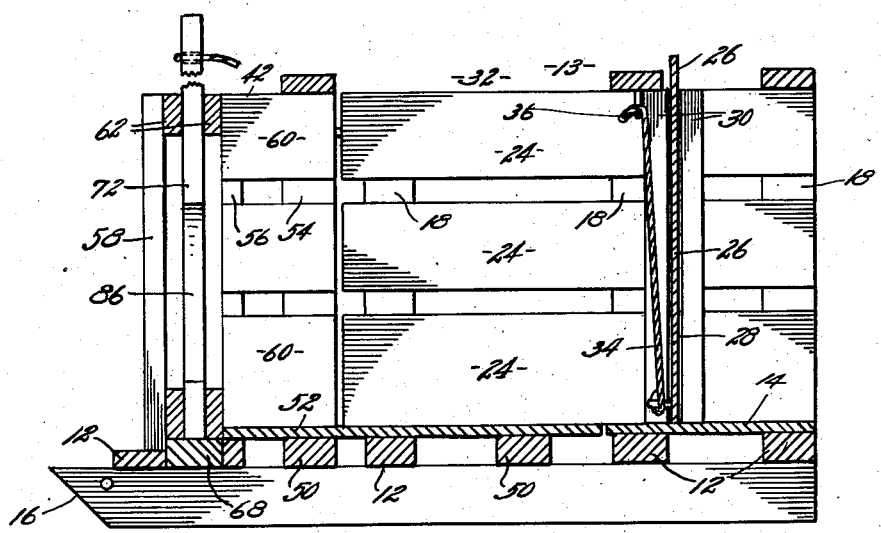
Fig. 4 is an enlarged longitudinal sectional view of the apparatus taken on line IV—IV of Figure 3.

Throughout the various views of the drawings like reference characters refer to similar parts and the numeral 10 designates a pair of spaced apart runners forming the base of the apparatus and secured together by transverse bars 12 which carries a rack 13 and to which is securely attached a floor section 14. The fore end of runners 10 are champhered at 16 to permit forward movement of the device in the usual manner. Vertical standards 18 mounted on transverse bars 12 are reinforced by angled metal brackets 20 and are also provided with top cross bars 22 for rigidly holding the vertical posts against accidental spreading.

These standards carry side wall members 24 shown as spaced apart boards nailed thereto. Adjacent the rear end of the apparatus is a vertically slidable door 26 mounted with its opposite side edges in vertical runways 28 formed by spaced apart strips 30 secured to the inner faces of said side wall members 24. It will be noted that the left side wall structure 32 extends more than one-half the length of the structure to include a set of strips 30.

An operating rope 34 extends to the lower central portion of door 26, passes upwardly through a staple 36, then over a rope fastener 37 positioned on top of standard 18 adjacent the door. The operator may raise the door 26 to the position shown in Figure 5 and secure it in said position when it is desired to drive an animal into the rack. Then he may lower the door and by releasing the rope 34 from its fastening, the door may be permitted to drop to the closed position behind the animal. The forward end portion 38 of the rack includes a relatively long right side wall section 40 and a shorter left side wall section 42 and is hinged at its right lower side to the base 10 by hinges 44. This hinged portion has a pair of vertical standards 46 to which the hinges 44 are secured and to which the side boards 48 are attached. This side wall 40 extends to the forward end of the chute and to a point adjacent the forward end of the short right hand section 32 to normally form a continuous side wall for the rack. The short left wall section 42 is interconnected with the wall section 40 by transverse bars 50 carrying floor section 52 and to which the wall standards 54, 56 and 58 are secured. The wall boards 60 are attached to standards 54 and 56 to form the wall section normally in alignment with the fastened wall section 32. Standards 56 and 58 are interconnected by spaced apart top cross bars 62 to similar standards 64 and 66 which form the forward end portion of wall section 40. These standards 56 and 58 and 64 and 66 are secured at their lower extremity to secure base member 68. Spaced apart transverse bars 70 are secured in spaced apart relation to the adjacent faces of standards 56 and 58 and 66 and 68 to receive stanchion members 72 and 74 therebetween. Stanchion 72 is secured at its lower end by pin 76 between bars 70, and between the top cross bar 62 by means of pin 78. A series of holes 80 in bars 62 permit of transverse adjustment of the upper end of the stanchion member 72, while a series of holes 82 in the lower cross bars 70 provide for adjustment of said stanchion member 72 which is secured in a fixed position relative to a hinged rack member. The other stanchion member 74 is pivoted at its lower extremity by pin 84 positioned in one of the holes 82 while the upper end thereof is free for transverse movement whereby the distance between the stanchion members may be varied to receive and to secure the head of the animal in position therebetween.

The adjacent edge portions of the stanchion members intermediate their ends are recessed at 86 to conform somewhat to the contour of the animal's neck. The stanchion members are so adjustably mounted that they may be positioned to engage the animal necks of various sizes and shapes. The stanchion operating cable 88 secured at 90 to one end of the movable stanchion member 74 is slidably mounted through a hole 92 formed through the upper extremity of stanchion member 72 extends to engage a cable securing member 94 mounted on the top of the rear standard 46 of the hinged rack section. It will be noted that the stanchion members and all operating parts thereof are mounted on the hinged rack section to secure the stanchion members in fixed relative relation regardless of the hinged position of this movable section relative to the base member. Mounted for vertical adjustment on the inner face of wall section 42 is an angled back rest 96 slotted at 98 to receive the clamp bolt 100 which is secured in said side wall section. This back rest is set to substantially the height of the animals being treated and serves to hold the animal in substantially a fixed position in the hinged section when in a horizontal position (see Figure 2).

A leg 102 hinged to the outer side wall 40 is adapted to move on its hinged pivot by gravity as the hinged rack section is being lowered whereby said leg will attain a substantially vertical position to rest on the ground and support the side wall 40 in a substantially horizontal position. The hinged portion of the rack is provided with an eye 104 adapted to receive a hook 106 rigidly attached to the fixed section of the rack for securing the hinged portion against accidental hinging movement.

Figures 3, 5:
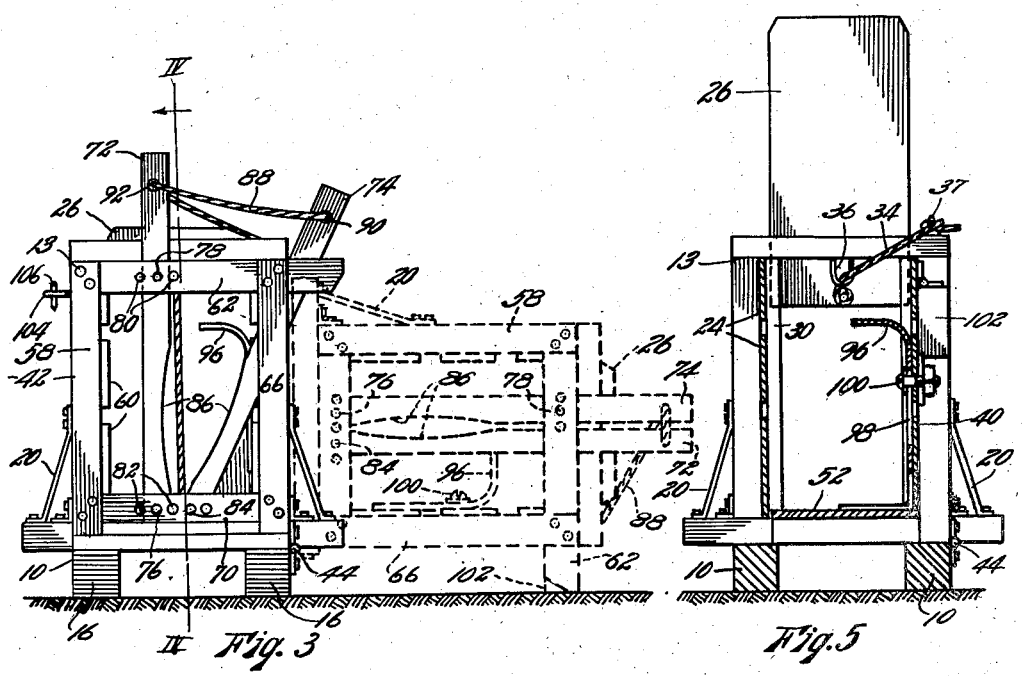
Fig. 3 is a reduced front elevation of the apparatus with the hinged section shown in dotted lines in the horizontal position.
Fig. 5 is a cross sectional view taken on line V—V of Figure 1 with the sliding door shown in the open position.

In the operation of this apparatus slide door 26 is raised to the position shown in Figure 5 while the stanchion members are in the position shown in Figure 3. The animal is driven into the rack 13 when it is in the position shown in Figure 1. As the animal moves to the forward end of the rack he will naturally extend his head through an opening between the stanchion members 72 and 74 when the operator, by grasping cord 88, may pull the movable stanchion member snugly against the animal's neck and then attach the cord to the fastener 90, thus holding the animal against any longitudinal movement. While the animal is in this position, any dehorning, ringing, or ear tagging operations may be performed without any interference due to the movement of the animal. Certain operations require that the animal shall be laid in a horizontal position and this is accomplished by simply grasping the upper portion of the hinged section of the hinged rack section, and moving it up the horizontal position shown in Figure 3, in dotted lines. A plan view of this position of the hinged member is shown in Figure 2 with the position of a hog mounted therein with his head extended through the stanchion and his back resting against the back stop 96. It will be apparent that the hog will be held securely in position and that any operations, such as vaccination, castration, etc., may be accomplished conveniently. After these operations have been performed the hinged section may be again moved to the vertical position and the hog released from the stanchion and outwardly through the open entrance to the rack.

In Figure 3 it will be noted that the extended end portion of transverse member 62 also serves as a supporting leg as indicated in dotted lines, when the hinged portion is in the horizontal position just described.

What I claim as new and desire to cover by Letters Patent is:

1. An animal handling apparatus comprising a base, an elongated rack carried by said base and having a forward section hingedly carried by said base, a stanchion mounted in the forward end of said hinged rack section to engage the neck of an animal being handled, and a vertically adjustable rigid back rest carried by said hinged rack section.

2. An animal handling apparatus comprising a base, an elongated rack carried by said base and having a forward section hingedly carried by said base, a stanchion mounted in the forward end of said hinged rack section adapted to secure an animal therein, a vertically slidable gate to control the entrance to said rack, and a rigid, vertically adjustable back rest carried by said hinged rack section.

3. An animal handling apparatus comprising a base, an elongated rack carried by said base and having its forward end section hinged for side movement relative to said base, a manually operable stanchion carried by said hinged rack section, adapted to operatively receive the neck of an animal therein, a vertically adjustable rigid back rest carried by the side wall of said hinged rack section at its hinged side adapted to engage the back of an animal positioned in said rack with its neck positioned in said stanchion whereby the animal is secured in relative relation to the hinged portion of said rack as it is moved to and from the horizontal position.

4. An animal handling apparatus comprising a base, an elongated rack carried by said base and having its forward end section hinged for side movement relative to said base and having side walls with their rearward ends disposed in longitudinally offset relation, a manually operable stanchion carried by said hinged rack section at its front end adapted to operatively receive the neck of an animal therein, a vertically adjustable rigid back rest carried by the side wall of said hinged rack section at its hinged side adapted to engage the back of an animal positioned in said rack with its neck positioned in said stanchion whereby the animal is secured in relative relation to the hinged portion of said rack as it is moved to and from the horizontal position, and a leg hinged to the upper portion of the hinged side wall of said rack section adapted to support said hinged rack section in the substantially horizontal position.

HARRY H. SEYLER.

REFERENCES CITED

The following references are of record in the file of this patent:

UNITED STATES PATENTS

| Number | Name | Date |
|---|---|---|
| 134,707 | Scott et al. | Jan. 7, 1873 |
| 538,442 | Driver | Apr. 30, 1895 |
| 652,103 | Ground et al. | June 19, 1900 |
| 994,752 | Kirchoff | June 13, 1911 |
| 1,388,258 | Hasty | Aug. 23, 1921 |
| 1,525,366 | Brown | Feb. 3, 1925 |